United States Patent
Wang et al.

(10) Patent No.: US 10,787,475 B2
(45) Date of Patent: Sep. 29, 2020

(54) METHODS OF MAKING LOW COLOR LIGNIN

(71) Applicant: INGEVITY SOUTH CAROLINA, LLC, North Charleston, SC (US)

(72) Inventors: Bing Wang, Mount Pleasant, SC (US); Guigui Wan, Hanahan, SC (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 6 days.

(21) Appl. No.: 16/183,401

(22) Filed: Nov. 7, 2018

(65) Prior Publication Data

US 2019/0135845 A1 May 9, 2019

Related U.S. Application Data

(60) Provisional application No. 62/582,746, filed on Nov. 7, 2017.

(51) Int. Cl.
*C07G 1/00* (2011.01)
*C08H 7/00* (2011.01)

(52) U.S. Cl.
CPC ........ *C07G 1/00* (2013.01); *C08H 6/00* (2013.01)

(58) Field of Classification Search
CPC .................................. C07G 1/00; C08H 6/00
See application file for complete search history.

(56) References Cited

U.S. PATENT DOCUMENTS

| | | | |
|---|---|---|---|
| 2,920,011 A * | 1/1960 | Eilers, Jr. ............ | D21C 9/1057 162/78 |
| 3,671,428 A * | 6/1972 | Kim .................... | C09K 8/36 507/106 |
| 3,672,817 A | 6/1972 | Falkehag | |
| 3,763,139 A | 10/1973 | Falkehag | |
| 3,945,917 A * | 3/1976 | Foster ................. | C02F 1/5236 210/662 |
| 4,184,845 A | 1/1980 | Lin | |
| 4,454,066 A | 6/1984 | Dilling et al. | |
| 4,594,168 A * | 6/1986 | Dupin ................. | C09K 8/203 507/108 |
| 4,713,185 A * | 12/1987 | Howard .............. | C09K 8/885 166/270.1 |
| 4,719,291 A * | 1/1988 | Chiu .................. | C08H 6/00 530/502 |
| 4,786,382 A * | 11/1988 | Utley .................. | C25B 3/02 205/689 |
| 4,789,523 A * | 12/1988 | Schilling ............ | C02F 1/5263 252/391 |
| 6,242,245 B1 * | 6/2001 | Amann ................ | C12P 1/00 435/277 |
| 6,258,209 B1 * | 7/2001 | Stohrer .............. | C07G 1/00 162/65 |
| 6,679,972 B1 * | 1/2004 | Tigerstrom ......... | D21C 9/004 162/63 |
| 2006/0207734 A1 * | 9/2006 | Day ..................... | D21C 3/18 162/70 |
| 2015/0284568 A1 * | 10/2015 | Sniady ................ | B27N 3/00 106/162.51 |

FOREIGN PATENT DOCUMENTS

GB 846812 A 8/1960

OTHER PUBLICATIONS

International Search Report for International Application No. PCT/US2018/059555, International Filing Date Nov. 7, 2018, dated Feb. 19, 2019, 5 pages.
Written Opinion for International Application No. PCT/US2018/059555, International Filing Date Nov. 7, 2018, dated Feb. 19, 2019, 7 pages.

* cited by examiner

*Primary Examiner* — Liam J Heincer
(74) *Attorney, Agent, or Firm* — Bryan D. Zerhusen, Esq.; Kimberly Vines, Esq.; Cantor Colburn LLP

(57) ABSTRACT

The present disclosure related to a method of producing a color stable, light colored lignin. The method includes: reacting a lignin composition with a hypochlorite composition having about 5% to about 70% available chlorine; and reacting the hypochlorite treated lignin with hydrogen peroxide at a concentration of about 5% to about 50% to produce the light colored lignin, wherein the lignin composition includes at least one of sulfonated lignin, lignosulfonate, or both.

19 Claims, No Drawings

METHODS OF MAKING LOW COLOR LIGNIN

CROSS REFERENCE TO RELATED APPLICATIONS

This application claims priority to U.S. Provisional Patent Application Ser. No. 62/582,746, filed on 7 Nov. 2017, the contents of which are incorporated herein by reference in its entirety for all purposes.

BACKGROUND

Field of the Invention

The present disclosure relates to a novel color reduction process for sulfonated lignins and lignosulfonates. More particularly, the disclosure relates to color reduction of lignins by an oxidative process using either sulfonated lignins or lignosulfonates (e.g., blocked or unblocked sulfonated lignins and/or lignosulfonates).

Background of the Discovery

Sulfonated lignins are generated in the kraft pulping process. The kraft process utilizes sodium hydroxide for digesting the wood chips followed by sodium sulfide treatment to produce water soluble sulfonated lignins. Lignosulfonates are also produced in the sulfite pulping process. The sulfite pulping process is an acidic process, where sulfurous acid is used for digesting the pulp to produce water soluble lignosulfonates.

The harsh conditions of the kraft pulping process and the sulfite pulping process create strongly colored lignin products. Despite the excellent dispersant properties of sulfonated lignins and lignosulfonates, the dark color of these lignin products has severely limited their applications.

Despite the significant efforts in studying chromophore formation during lignin processing, the cause and mechanisms is still not fully understood. It is generally believed, however, that lignin-attached catechol structures, upon oxidization, change to the darker colored o-quinones.

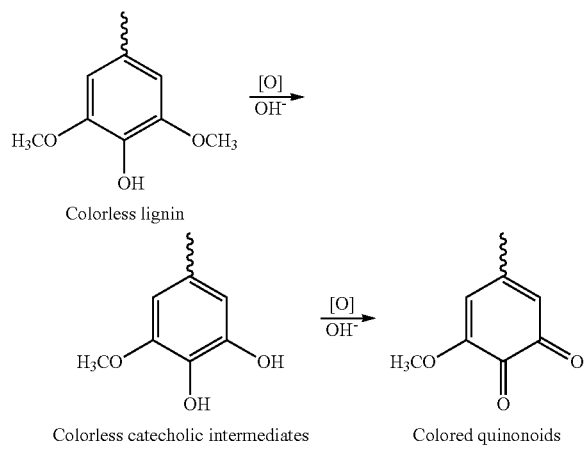

Therefore, preventing or breaking the o-quinones formation has been the focus of many studies looking to address the chromophore formation during lignin processing.

Partially blocking the free phenolic hydroxyls can reduce some color formation, but it does not adequately address the chromophore formation observed during processing. For example, U.S. Pat. No. 3,672,817 purports to reduce as much as 44% of lignin color by blocking the phenolic hydroxyl with an alkylene oxide or a halogen-containing alkyl alcohol. Furthermore, U.S. Pat. No. 3,763,139 purports to reduce lignin color by blocking the phenolic hydroxyl with chloromethane sulfonate, chloromethane phosphonate, and 2-chloroethanol. Thus, is has been purported that blocking lignins (i.e., lignins with phenolic groups that have been blocked by reagents such as dialkyl sulfate, alkene oxides or halogen-containing alkyl or acetate) make subsequent bleaching processes more effective and non-reversible because the blocking reaction eliminates a potential route for re-forming quinonoid chromophores, which is believed to be associated with the chromophore formation in lignins. Several partially blocked sulfonated lignin products have been produced and are commercially available, for example REAX LS and REAX 825E by INGEVITY (North Charleston, S.C.), which have lower color than unblocked sulfonated lignin, such as REAX 85A (INGEVITY). However, the color of blocked lignins has not been sufficiently reduced for many applications.

Some have utilized blocked lignins as a starting material for oxidative treatment to further reduce the color of the lignins. For example, U.S. Pat. No. 4,184,845 describes a two-step process that purports to reduce the color of sulfonated alkali lignins and lignosulfonates by at least 80%, by (1) blocking most of the free-phenolic hydroxyl groups in the lignin followed by (2) oxidation by air, molecular oxygen or hydrogen peroxide. However, this process requires a high pressure oxidation reaction with either oxygen or air. This adds additional operational cost and additional complexities when scaling the process up for commercial production.

U.S. Pat. No. 4,454,066 describes a similar two-step process, but utilizes chlorine dioxide as the oxidative reagent in the second step. The publication purports to achieve over a 90% color reduction in the sulfonated lignin and lignosulfonate. Chlorine dioxide is a powerful bleaching agent, commonly used in wood pulp bleaching, but it has to be generated in-situ. For example, sodium chlorite can be reacted with chlorine gas to produce chlorine dioxide:

$$2\ NaClO_2 + Cl_2 \rightarrow 2\ ClO_2 + 2\ NaCl.$$

However, if not handled carefully, chlorine dioxide may decompose explosively into chlorine and oxygen. Thus, the above described two-step process creates potential hazardous conditions for laboratory scale experimentations and for commercial scale production.

Therefore, there exists a need for a safe and more effective method of reducing lignin color, e.g. a process that utilizes a safer and more effective oxidative reagent.

SUMMARY

The present disclosure describes the surprising and unexpected discovery that a unique sequential oxidative process for lignosulfonates and/or sulfonated lignins is capable of reducing color, thereby effectively producing color stable, light color lignin. Thus, an aspect of the present disclosure provides a method of producing light colored lignin, the method comprising: reacting a lignin composition with a hypochlorite (ClO$^-$) composition having about 5% to about 70% available chlorine; and reacting the hypochlorite treated lignin with hydrogen peroxide ($H_2O_2$) at a concentration of about 5% to about 50% to produce the light colored lignin, wherein the lignin composition includes at least one of sulfonated lignin, lignosulfonate, or both. The method of the present disclosure can be utilized to reduce the color of both blocked and unblocked lignosulfonates, as well as blocked and unblocked sulfonated lignins.

In some embodiments, at least one of: reacting the lignin composition with a hypochlorite composition includes adjusting at least one of the lignin composition, the reaction mixture containing the lignin composition, or both to a pH<about 7, or a temperature<about 100° C., or both; reacting the hypochlorite treated lignin includes adjusting at least one of the hypochlorite treated lignin, the reaction mixture containing the hypochlorite treated lignin, or both to a pH>about 7, or a temperature<about 100° C., or both; or a combination thereof.

In further embodiments, the method further comprises filtering the hypochlorite treated lignin to remove salts formed during the reaction.

In certain embodiments, the method further comprises filtering the light colored lignin to remove salts formed during the reaction.

In another embodiment, the method further comprises sparging the hypochlorite treated lignin.

In other embodiments, at least one of: sparging is performed for at least about 1 hour (e.g., about 1 hour to about 5 hours); sparging is a nitrogen or air sparging; or a combination thereof.

In particular embodiments, the hypochlorite composition includes at least one of a sodium hypochlorite salt, a potassium hypochlorite salt, a calcium hypochlorite salt, a magnesium hypochlorite salt, or a combination thereof.

In additional embodiments, the amount of the hypochlorite composition reacting with the lignin composition is about 10% to about 250% of the lignin composition weight.

In some embodiments, the amount of hydrogen peroxide reacting with the hypochlorite treated lignin is about 10% to about 250% of the lignin composition weight.

In further embodiments, adjusting the pH<about 7 is performed with at least one of hydrochloric acid, phosphoric acid, sulfuric acid, acetic acid, or a combination thereof.

In an embodiment, adjusting the pH>about 7 is performed with at least one of sodium hydroxide, potassium hydroxide, calcium hydroxide, magnesium hydroxide, or a combination thereof.

In certain embodiments, the lignin composition includes blocked sulfonated lignin or lignosulfonate.

In other embodiments, the lignin composition includes unblocked sulfonated lignin or lignosulfonate.

In an embodiment, the lignin composition is an aqueous solution having about 1% to about 60% w/v sulfonated lignin or lignosulfonate.

In addition embodiments, the method further comprises at least one of: concentrating the low color lignin; drying the low color lignin; or both.

In a particular embodiment, the low color lignin is spray dried.

In some embodiments, the color of a blocked lignin composition comprising blocked lignosulfonates or blocked sulfonated lignin is reduced by about 80% to about 99% relative to the untreated blocked lignin composition.

In other embodiments, the color of an unblocked lignin composition comprising unblocked lignosulfonates or unblocked sulfonated lignin is reduced by about 70% to about 99% relative to the untreated unblocked lignin composition.

In certain embodiments, the light colored lignin is color stable at temperatures up to about 150° C.

In an embodiment, the light colored lignin is color stable at a pH ranging from about 8 to about 10.

In other embodiments, at least one of: the hypochlorite composition is slowly added to the lignin composition; the hydrogen peroxide is slowly added to the hypochlorite treated lignin; or a composition thereof.

A further aspect of the present disclosure provides a light color lignin produce by the method of the present disclosure.

DETAILED DESCRIPTION

The present disclosure will now be described more fully hereinafter, but not all embodiments of the disclosure are shown. While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular structure or material to the teachings of the disclosure without departing from the essential scope thereof.

Where a range of values is provided, it is understood that each intervening value between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

The following terms are used to describe the present disclosure. In instances where a term is not specifically defined herein, that term is given an art-recognized meaning by those of ordinary skill applying that term in context to its use in describing the present disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. It should also be understood that, unless clearly indicated to the contrary, in any methods claimed herein that include more than one step or act, the order of the steps or acts of the method is not necessarily limited to the order in which the steps or acts of the method are recited.

Residual pulping liquors contain lignin as a by-product, which is one of the major sources of lignin. The lignin recovered from the sulfite process is water-soluble lignosulfonate. In contrast, the lignin recovered from the kraft or soda process is not sulfonated and insoluble in water. However, kraft lignin can be subsequently sulfonated to produce water soluble products, such as dispersants. As used herein, the phrase "sulfonated lignin" refers to the sulfonated kraft lignin, while the phrase "lignosulfonate" refers to lignin derived from the sulfite pulping liquors. Unless the context suggests otherwise, the phrase "lignin" or "lignins" as used herein includes both sulfonated lignins and lignosulfonates.

The inventors have found that even with a 50% hydrogen peroxide solution the color reduction of blocked sulfonated lignins, such as REAX LS and REAX 825E, was insufficient. In the pursuit of finding an ecofriendly and sustainable process that avoids harsh conditions, such as high pressure oxidation with oxygen and air or dangerous chemicals such as chlorine dioxide and ozone, the inventors surprisingly, and unexpectedly, discovered a method of producing stable light colored lignin.

It was surprising and unexpectedly discovered that hypochlorite in, for example, household bleach, is an effective color reduction agent for sulfonated lignins and lignosulfonate. Hypochlorite treatment is able to achieve an at least 50% color reduction compared to the original blocked sulfonated lignins. This was done at a low pH condition as illustrated in following scheme.

$$2ClO^- + 4H^+ \rightarrow Cl_2 + 2H_2O$$

As such, in an aspect, the disclosure provides a method of producing low or light colored sulfonated lignin or lignosulfonate comprising treating a mixture comprising a sulfonated lignin or lignosulfonate with an effective amount of hypochlorite, wherein the hypochlorite reduces the color of the sulfonated lignin or lignosulfonate. In certain embodiments, the effective amount of hypochlorite is from about 50% w/v to about 250% w/v of the amount of lignin in the composition. In certain embodiments, the method results in a reduction in lignin color of at least 50% as compared to untreated lignin.

In any of the aspects or embodiments described herein, color reduction is determined by measuring the samples at 500 nm with a HP 8453 UV-Vis Spectrophotometer with G1120A Multicell transport and/or by the Gardner scale (ASTM D1544-04(2010)) with a ColorQuest XT spectrophotometer (HunterLab; Reston, Va.). In certain embodiments, color measurments are carried out using a 0.1% solution of lignin sulfonates or sulfonated lignin in deionized water.

Although noticeable degrees of lignin color reduction can be achieved with only a relatively mild bleaching agent, such as hypochlorite, further reduction in color is desirable. Furthermore, similar to the low color lignosulfonates and sulfonated lignins treated by reagents, such as, NaClO, NaClO$_2$, H$_2$O$_2$, as described in U.S. Pat. No. 4,454,066, lignin treated with only a mild bleaching agent tend to be sensitive to conditions such as temperature and pH (e.g., the low color lignin darkens upon heating and pH changes). The present disclosure observed similar temperature and pH sensitivity in low color lignosulfonates and sulfonated lignins that were only treated with hypochlorite.

Thus, it was surprisingly and unexpectedly discovered that the color of hypochlorite treated lignosulfonates and sulfonated lignins could be further reduced up to about 99%, relative to an untreated lignosulfonates and sulfonated lignins, by adjusting the pH of the hypochlorite treated lignosulfonates and sulfonates lignins solution to a basic condition and treating the hypochlorite treated lignosulfonates with hydrogen peroxide.

$$H_2O_2 + 2OH^- \rightarrow O_2 + 2H_2O$$

The two-step method as described herein produces a low color lignin that has enhanced color stability under various condition changes, such as pH, temperature and pressure, which is not observed by other low color lignin. The method of the present disclosure also achieves similar or even higher levels of lignin color reduction on blocked lignins than that which is achieved from using chlorine dioxide.

U.S. Pat. No. 4,184,845 describes a high pressure oxygen treatment that it purports the ability to reduce blocked lignosulfonates and sulfonated lignins color by 80%, but only reduce the color of unblocked lignosulfonates and sulfonated lignins by 20%. The efficacy of the color reduction in U.S. Pat. No. 4, 184,845 is reduced in the unblocked lignosulfonates and sulfonated lignins because the unblocked phenolic groups in lignosulfonates and sulfonated lignins tend to be oxidized to quinonoid chromophores by the decoloring process.

In contrast to other color reduction methods, as described above, the method of the present disclosure can also significantly reduce the color of unblocked sulfonated lignin, such as, e.g., REAX® 85A AND REAX® 260 (Ingevity Corporation, North Charleston, S.C.). As demonstrated below, the method of the present disclosure can reduce the color of unblocked sulfonated lignin (e.g., REAX® 85A) by at least 70% and the color of unblocked lignosulfonate (e.g., REAX® 260) by at least 80% relative to the untreated unblocked sulfonated lignin or lignosulfonate.

While not being limited to any particular theory, it is possible that the hypochlorite treatment may be creating some amount of blocking, thereby protecting the free phenolic groups so that the quinonoids would not be re-formed in the hydrogen peroxide oxidative stage.

As discussed above, an aspect of the present disclosure provides a method of producing light colored lignin that includes: reacting a lignin composition with a hypochlorite composition having about 5% to about 70% available chlorine; and reacting the hypochlorite treated lignin with hydrogen peroxide at a concentration of about 5% to about 50% to produce the light colored lignin, wherein the lignin composition includes at least one of sulfonated lignin, lignosulfonate, or both. In certain embodiments, the hypochlorite composition includes at least one of a sodium hypochlorite salt, a potassium hypochlorite salt, a calcium hypochlorite salt, a magnesium hypochlorite salt, or a combination thereof.

For example, the hypochlorite composition may comprise about 5% to about 70% available chlorine, about 5% to about 65% available chlorine, about 5% to about 60% available chlorine, about 5% to about 55% available chlorine, about 5% to about 50% available chlorine, about 5% to about 45% available chlorine, about 5% to about 40% available chlorine, about 5% to about 35% available chlorine, about 5% to about 30% available chlorine, about 5% to about 25% available chlorine, about 5% to about 20% available chlorine, about 10% to about 70% available chlorine, about 10% to about 65% available chlorine, about 10% to about 60% available chlorine, about 10% to about 55% available chlorine, about 10% to about 50% available chlorine, about 10% to about 45% available chlorine, about 10% to about 40% available chlorine, about 10% to about 35% available chlorine, about 10% to about 30% available chlorine, about 10% to about 25% available chlorine, about 15% to about 70% available chlorine, about 15% to about 65% available chlorine, about 15% to about 60% available chlorine, about 15% to about 55% available chlorine, about 15% to about 50% available chlorine, about 15% to about 45% available chlorine, about 15% to about 40% available chlorine, about 15% to about 35% available chlorine, about 15% to about 30% available chlorine, about 20% to about 70% available chlorine, about 20% to about 65% available chlorine, about 20% to about 60% available chlorine, about 20% to about 55% available chlorine, about 20% to about 50% available chlorine, about 20% to about 45% available chlorine, about 20% to about 40% available chlorine, about 20% to about 35% available chlorine, about 25% to about 70% available chlorine, about 25% to about 65% available chlorine, about 25% to about 60% available chlorine, about 25% to about 55% available chlorine, about 25% to about 50% available chlorine, about 25% to about 45% available chlorine, about 25% to about 40% available chlorine, about 30% to about 70% available chlorine, about 30% to about 65% available chlorine, about 30% to about 60% available chlorine, about 30% to about 55% available chlorine, about 30% to about 50% available chlorine, about 30% to about 45% available chlorine, about 35% to about 70% available chlorine, about 35% to about 65% available chlorine, about 35% to about 60% available chlorine, about 35% to about 55% available chlorine, about 35% to about 50% available chlorine, about 40% to about 70% available chlorine, about 40% to about 65% available chlorine, about 40% to about 60% available chlorine, about 40% to about 55% available chlorine, about 45% to about 70% available chlorine, about 45% to about 65% available chlorine, about 45% to about 60% available chlorine, about 50% to about 70% available chlorine, about 50% to about 65% available chlorine, about 55% to about 40% available chlorine.

Furthermore, the hydrogen peroxide may be, e.g., at a concentration of about 5% to about 50%, about 5% to about 45%, about 5% to about 40%, about 5% to about 35%, about 5% to about 30%, about 5% to about 25%, about 5% to about 20%, about 5% to about 15%, about 10% to about 50%, about 10% to about 45%, about 10% to about 40%, about 10% to about 35%, about 10% to about 30%, about 10% to about 25%, about 10% to about 20%, about 15% to about 50%, about 15% to about 45%, about 15% to about 40%, about 15% to about 35%, about 15% to about 30%, about 15% to about 25%, about 20% to about 50%, about 20% to about 45%, about 20% to about 40%, about 20% to about 35%, about 20% to about 30%, about 25% to about 50%, about 25% to about 45%, about 25% to about 40%, about 25% to about 35%, about 30% to about 50%, about 30% to about 45%, about 30% to about 40%, about 35% to about 50%, about 35% to about 45%, or about 40% to about 50%.

In some embodiments, reacting the lignin composition with a hypochlorite composition includes adjusting at least one of the lignin composition, the reaction mixture containing the lignin composition, or both to a pH <about 7 (e.g., about 1, about 1.5, about 2, about 2.5, about 3, about 3.5, about 4, about 4.5 about 5, about 5.5, about 6, or about 6.5). For example, reacting the lignin composition with a hypochlorite composition includes adjusting at least one of the lignin composition, the reaction mixture containing the lignin composition, or both to a pH of <about 6, <about 5, <about 4 <about 3, <about 2, about 1 to less than about 7, about 1 to about 5.5, about 1 to about 4, about 1 to about 2.5, about 2 to less than about 7, about 3 to about 5.5, about 2 to about 4, about 3 to less than about 7, about 3 to about 5.5, about 3 to about 4, about 4 to less than 7, about 4 to about 5.5, or about 5 to less than about 7. Thus, the pH may be adjusted prior to the addition of the hypochlorite composition, while the hypochlorite composition is added, or both. Adjusting the pH of the lignin or the hypochlorite containing reaction mixture may be performed with at least one of hydrochloric acid, phosphoric acid, sulfuric acid, acetic acid, or a combination thereof.

In certain embodiments, reacting the lignin composition with a hypochlorite composition includes adjusting at least one of the lignin composition, the reaction mixture containing the lignin composition, or both to a temperature <about 100° C. For example, the temperature may be adjusted to <about 90° C., <about 85° C., <about 80° C., <about 75° C., <about 70° C., <about 65° C., <about 60° C., <about 55° C., <about 50° C., <about 45° C., <about 40° C., <about 35° C., <about 30° C., <about 25° C., <about 20° C.; about 20° C. to less than about 100° C., about 20° C. to less about 90° C., about 20° C. to less than about 80° C., about 20° C. to less than about 70° C., about 20° C. to less than about 60° C., about 20° C. to less than about 50° C., about 20° C. to less than about 40° C., about 30° C. to less than about 100° C., about 30° C. to less than about 90° C., about 30° C. to less than about 80° C., about 30° C. to less than about 70° C., about 30° C. to less than about 60° C., about 30° C. to less than about 50° C., about 40° C. to less than about 100° C., about 40° C. to less about 90° C., about 40° C. to less than about 80° C., about 40° C. to less than about 70° C., about 40° C. to less than about 60° C., about 50° C. to less than about 100° C., about 50° C. to less about 90° C., about 50° C. to less than about 80° C., about 50° C. to less than about 70° C., about 60° C. to less than about 100° C., about 60° C. to less about 90° C., about 60° C. to less than about 85° C., about 60° C. to less than about 80° C., about 70° C. to less than about 100° C., about 70° C. to less about 90° C., about 70° C. to less than about 85° C., about 70° C. to less than about 80° C., about 80° C. to less than about 100° C., or about 80° C. to less about 90° C.

In some embodiments, reacting the hypochlorite treated lignin includes adjusting at least one of the hypochlorite treated lignin, the reaction mixture containing the hypochlorite treated lignin, or both to a pH >about 7 (e.g., about 7.5, about 8, about 8.5, about 9, about 9.5, about 10, about 10.5, about 11, about 11.5, about 12, about 12.5, about 13, or about 14). For example, reacting the hypochlorite treated lignin may include adjusting at least one of the hypochlorite treated lignin, the reaction mixture containing the hypochlorite treated lignin, or both to a pH of >about 8, >about 9, >about 10, >about 11, >about 12, greater than about 7 to about 13, greater than about 7 to about 11.5, greater than about 7 to about 10, greater than about 7 to about 8.5, about 8 to about 13, about 8 to about 11.5, about 8 to about 10, about 9 to about 13, about 9 to about 11.5, about 9 to about 10, about 10 to about 13, about 10 to about 11.5, or about 11 to about 13). The pH may be adjusted prior to the addition of the hydrogen peroxide, while the hydrogen peroxide is added, or both. Adjusting the pH of the hypochlorite treated lignin may be performed with at least one of sodium hydroxide, potassium hydroxide, calcium hydroxide, magnesium hydroxide, or a combination thereof.

In certain embodiments, reacting the hypochlorite treated lignin includes adjusting at least one of the hypochlorite treated lignin, the reaction mixture containing the hypochlorite treated lignin, or both to a temperature <about 100° C. For example, the temperature may be adjusted to <about 90° C., <about 85° C., <about 80° C., <about 75° C., <about 70° C., <about 65° C., <about 55° C., <about 50° C., <about 45° C., <about 40° C., <about 35° C., <about 30° C., <about 25° C., <about 20° C.; about 20° C. to less than about 100° C., about 20° C. to less about 90° C., about 20° C. to less than about 80° C., about 20° C. to less than about 70° C., about 20° C. to less than about 60° C., about 20° C. to less than about 50° C., about 20° C. to less than about 40° C., about 30° C. to less than about 100° C., about 30° C. to less about 90° C., about 30° C. to less than about 80° C., about 30° C. to less than about 70° C., about 30° C. to less than about 60° C., about 30° C. to less than about 50° C., about 40° C. to less than about 100° C., about 40° C. to less about 90° C., about 40° C. to less than about 80° C., about 40° C. to less than about 70° C., about 40° C. to less than about 60° C., about 50° C. to less than about 100° C., about 50° C. to less about 90° C., about 50° C. to less than about 80° C., about 50° C. to less than about 70° C., about 60° C. to less than about 100° C., about 60° C. to less about 90° C., about 60° C. to less than about 85° C., about 60° C. to less than about 80° C., about 70° C. to less than about 100° C., about 70° C. to less about 90° C., about 70° C. to less than about 85° C., about 70° C. to less than about 80° C., about 80° C. to less than about 100° C., or about 80° C. to less than about 90° C.

In further embodiments, the method further comprises filtering the hypochlorite treated lignin to remove salts formed during the reaction. For example, the hypochlorite treated lignin may be filtered with a fritted glass funnel.

In certain embodiments, the method further comprises filtering the light colored lignin to remove salts formed during the reaction. For example, the hypochlorite treated lignin may be filtered with a fritted glass funnel.

In another embodiment, the method further comprises sparging the hypochlorite treated lignin. For example, the hypochlorite treated lignin may be sparged for at least about 1 hour (e.g., about 1 hour to about 5 hours, about 1 hour to about 4 hours, about 1 hour to about 3 hours, about 2 hours to about 5 hours, or about 2 hours to about 4 hours). Furthermore, the sparging may include a nitrogen sparging or an air sparging.

In additional embodiments, the amount of the hypochlorite composition (wt %) reacting with the lignin composition is about 10% to about 250% of the lignin composition weight. For example, the amount of the hypochlorite composition may be about 10% to about 250%, about 10% to about 225%, about 10% to about 200%, about 10% to about 175%, about 10% to about 150%, about 10% to about 125%, about 10% to about 100%, about 10% to about 75%, about 10% to about 50%, about 10% to about 30%, about 25% to about 250%, about 25% to about 225%, about 25% to about 200%, about 25% to about 175%, about 25% to about 150%, about 25% to about 125%, about 25% to about 100%, about 25% to about 75%, about 25% to about 50%, about 50% to about 250%, about 50% to about 225%, about 50% to about 200%, about 50% to about 175%, about 50% to about 150%, about 50% to about 125%, about 50% to about 100%, about 50% to about 75%, about 75% to about 250%, about 75% to about 225%, about 75% to about 200%, about 75% to about 175%, about 75% to about 150%, about 75% to about 125%, about 75% to about 100%, about 75% to about 250%, about 75% to about 225%, about 75% to about 200%, about 75% to about 175%, about 75% to about 150%, about 75% to about 125%, about 75% to about 100%, about 100% to about 250%, about 100% to about 225%, about 100% to about 200%, about 100% to about 175%, about 100% to about 150%, about 100% to about 125%, about 125% to about 250%, about 125% to about 225%, about 125% to about 200%, about 125% to about 175%, about 125% to about 150%, about 150% to about 250%, about 150% to about 225%, about 150% to about 200%, about 150% to about 175%, about 175% to about 250%, about 175% to about 225%, about 175% to about 200%, about 200% to about 225%, about 225% to about 250 of the lignin composition weight.

In some embodiments, the amount of the hydrogen peroxide (wt %) reacting with the hypochlorite treated lignin is about 10% to about 250% of the lignin composition weight. For example, the amount of the hydrogen peroxide may be about 10% to about 250%, about 10% to about 225%, about 10% to about 200%, about 10% to about 175%, about 10% to about 150%, about 10% to about 125%, about 10% to about 100%, about 10% to about 75%, about 10% to about 50%, about 10% to about 30%, about 25% to about 250%, about 25% to about 225%, about 25% to about 200%, about 25% to about 175%, about 25% to about 150%, about 25% to about 125%, about 25% to about 100%, about 25% to about 75%, about 25% to about 50%, about 50% to about 250%, about 50% to about 225%, about 50% to about 200%, about 50% to about 175%, about 50% to about 150%, about 50% to about 125%, about 50% to about 100%, about 50% to about 75%, about 75% to about 250%, about 75% to about 225%, about 75% to about 200%, about 75% to about 175%, about 75% to about 150%, about 75% to about 125%, about 75% to about 100%, about 75% to about 250%, about 75% to about 225%, about 75% to about 200%, about 75% to about 175%, about 75% to about 150%, about 75% to about 125%, about 75% to about 100%, about 100% to about 250%, about 100% to about 225%, about 100% to about 200%, about 100% to about 175%, about 100% to about 150%, about 100% to about 125%, about 125% to about 250%, about 125% to about 225%, about 125% to about 200%, about 125% to about 175%, about 125% to about 150%, about 150% to about 250%, about 150% to about 225%, about 150% to about 200%, about 150% to about 175%, about 175% to about 250%, about 175% to about 225%, about 175% to about 200%, about 200% to about 250%, about 200% to about 225%, about 225% to about 250 of the lignin composition weight.

In any aspect or embodiment described herein, the lignin composition may include at least one of: blocked sulfonated lignin, unblocked sulfonated lignin, blocked lignosulfonate, unblocked lignosulfonate, or a combination thereof. The lignin composition may be an aqueous solution having about 1% to about 60% (w/v) sulfonated lignin or lignosulfonate. For example, the lignin composition may be an aqueous solution comprising about 1% to about 60%, about 1% to about 55%, about 1% to about 50%, about 1% to about 45%, about 1% to about 40%, about 1% to about 35%, about 1% to about 30%, about 1% to about 25%, about 1% to about 20%, about 1% to about 15%, about 1% to about 10%, about 5% to about 60%, about 5% to about 55%, about 5% to about 50%, about 5% to about 45%, about 5% to about 40%, about 5% to about 35%, about 5% to about 30%, about 5% to about 25%, about 5% to about 20%, about 5% to about 15%, about 10% to about 60%, about 10% to about 55%, about 10% to about 50%, about 10% to about 45%, about 10% to about 40%, about 10% to about 35%, about 10% to about 30%, about 10% to about 25%, about 10% to about 20%, about 15% to about 60%, about 15% to about 55%, about 15% to about 50%, about 15% to about 45%, about 15% to about 40%, about 15% to about 35%, about 15% to about 30%, about 15% to about 25%, about 20% to about 60%, about 20% to about 55%, about 20% to about 50%, about 20% to about 45%, about 20% to about 40%, about 20% to about 35%, about 20% to about 30%, about 25% to about 60%, about 25% to about 55%, about 25% to about 50%, about 25% to about 45%, about 25% to about 40%, about 25% to about 35%, about 30% to about 60%, about 30% to about 55%, about 30% to about 50%, about 30% to about 45%, about 30% to about 40%, about 35% to about 60%, about 35% to about 55%, about 35% to about 50%, about 35% to about 45%, about 40% to about 60%, about 40% to about 55%, about 40% to about 50%, about 45% to about 60%, about 45% to about 55%, about 50% to about 60% w/v sulfonated lignin or lignosulfonate.

The method of the present disclosure may further comprise additional process steps to produce low-colored lignin that is appropriate for specific applications. For example, the method may further comprise at least one of: concentrating the low color lignin, drying the low color lignin (e.g., spray dried), or both.

The method of the present disclosure may reduce the color of a blocked lignin composition comprising blocked lignosulfonates, blocked sulfonates lignins, or a combination thereof, by from about 50% to about 99% relative to the untreated blocked lignin composition, or about 80% to about 99% relative to the untreated blocked lignin composition. For example, the color reduction achieve may be about 50% to about 99%, about 80% to about 99%, about 80% to about 95%, about 80% to about 90%, about 80% to about 85%, about 90% to about 99%, about 90% to about 95%, or about 95% to about 99%.

The method of the present disclosure may reduce the color of an unblocked lignin composition comprising unblocked lignosulfonates, unblocked sulfonated lignins, or a combination thereof, by about 50% to about 99%, or about 70% to about 99% relative to the untreated unblocked lignin composition. For example, the color reduction achieve may be about 50% to about 99%, about 70% to about 99%, about 70% to about 95%, about 70% to about 90%, about 70% to about 85%, about 70% to about 80%, about 70% to about 75%, about 75% to about 99%, about 75% to about 95%, about 75% to about 90%, about 75% to about 85%, about 75% to about 80%, about 80% to about 99%, about 80% to about 95%, about 80% to about 90%, about 80% to about 85%, about 85% to about 99%, about 85% to about 95%, about 85% to about 90%, about 90% to about 99%, or about 90% to about 95%, about 95% to about 99%.

In any aspect or embodiment described herein, the light colored lignin produced by the method of the present disclosure is color stable (i.e., has a stable color) for a period of time less than or equal to about 1 year at a temperature ranging from ambient temperature (i.e., around 20° C.) to about 150° C. For example, the light colored lignin may have a stable color at a temperature about 150° C., about 140° C., about 130° C., about 120° C., about 110° C., about 100° C., about 90° C., about 80° C., about 70° C., about 60° C., about 50° C., about 30° C., or about 20° C. for up to 1 year. In any aspect or embodiment described herein, the light color lignin is color stable for about a year, about 11.5 months, about 11 months, about 10.5 months, about 10 months, about 9.5 months, about 9 months, about 8.5 months, about 8 months, about 7.5 months, about 7 months, about 6.5 months, about 6 months, about 5.5 months, about 5 months, about 4.5 months, about 4 months, about 3.5 months, about 3 months, about 2.5 months, about 8 weeks, about 7 weeks, about 6 weeks, about 5 weeks, about 4 weeks, about 3.5 weeks, about 3 weeks, about 2.5 weeks, about 2 weeks, about 1.5 weeks, about 1 weeks, about 6 days, about 5 days, about 4 weeks, about 3 weeks, about 48 hours, about 42 hours, about 36 hours, about 30 hours, about 24 hours, about 22 hours, about 20 hours, about 18 hours, about 16 hours, about 14 hours, about 12 hours, about 10 hours, about 8 hours, about 6 hours, about 4 hours, about 6 hours to about 1 year, about 6 hours to about 11 months, about 6 hours to about 10 months, about 6 hours to about 9 months, about 6 hours to about 8 months, about 6 hours to about 7 months, about 6 hours to about 6 months, about 6 hours to about 5 months, about 6 hours to about 4 months, about 6 hours to about 3 months, about 6 hours to about 2 months, about 6 hours to about 4 weeks, about 6 hours to about 3 weeks, about 6 hours to about 2 weeks, about 6 hours to about 7 days, about 6 hours to about 6 days, about 6 hours to about 5 days, about 6 hours to about 4 days, about 6 hours to about 3 days, about 6 hours to about 48 hours, about 6 hours to about 24 hours, about 6 hours to about 18 hours, about 12 hours to about 1 year, about 12 hours to about 11 months, about 12 hours to about 10 months, about 12 hours to about 9 months, about 12 hours to about 8 months, about 12 hours to about 7 months, about 12 hours to about 6 months, about 12 hours to about 5 months, about 12 hours to about 4 months, about 12 hours to about 3 months, about 12 hours to about 2 months, about 12 hours to about 4 weeks, about 12 hours to about 3 weeks, about 12 hours to about 2 weeks, about 12 hours to about 7 days, about 12 hours to about 6 days, about 12 hours to about 5 days, about 12 hours to about 4 days, about 12 hours to about 3 days, about 12 hours to about 48 hours, about 12 hours to about 24 hours, about 18 hours to about 1 year, about 18 hours to about 11 months, about 18 hours to about 10 months, about 18 hours to about 9 months, about 18 hours to about 8 months, about 18 hours to about 7 months, about 18 hours to about 6 months, about 18 hours to about 5 months, about 18 hours to about 4 months, about 18 hours to about 3 months, about 18 hours to about 2 months, about 18 hours to about 4 weeks, about 18 hours to about 3 weeks, about 18 hours to about 2 weeks, about 18 hours to about 7 days, about 18 hours to about 6 days, about 18 hours to about 5 days, about 18 hours to about 4 days, about 18 hours to about 3 days, about 18 hours to about 48 hours, about 18 hours to about 36 hours, about 24 hours to about 1 year, about 24 hours to about 11 months, about 24 hours to about 10 months, about 24 hours to about 9 months, about 24 hours to about 8 months, about 24 hours to about 7 months, about 24 hours to about 6 months, about 24 hours to about 5 months, about 24 hours to about 4 months, about 24 hours to about 3 months, about 24 hours to about 2 months, about 24 hours to about 4 weeks, about 24 hours to about 3 weeks, about 24 hours to about 2 weeks, about 24 hours to about 7 days, about 24 hours to about 6 days, about 24 hours to about 5 days, about 24 hours to about 4 days, about 24 hours to about 3 days, about 24 hours to about 48 hours, about 36 hours to about 1 year, about 36 hours to about 11 months, about 36 hours to about 10 months, about 36 hours to about 9 months, about 66 hours to about 8 months, about 36 hours to about 7 months, about 36 hours to about 6 months, about 36 hours to about 5 months, about 36 hours to about 4 months, about 36 hours to about 3 months, about 36 hours to about 2 months, about 36 hours to about 4 weeks, about 36 hours to about 3 weeks, about 36 hours to about 2 weeks, about 36 hours to about 7 days, about 36 hours to about 6 days, about 36 hours to about 5 days, about 36 hours to about 4 days, about 36 hours to about 3 days, about 2 days to about 1 year, about 2 days to about 11 months, about 2 days to about 10 months, about 2 days to about 9 months, about 2 days to about 8 months, about 2 days to about 7 months, about 2 days to about 6 months, about 2 days to about 5 months, about 2 days to about 4 months, about 2 days to about 3 months, about 2 days to about 2 months, about 2 days to about 4 weeks, about 2 days to about 3 weeks, about 2 days to about 2 weeks, about 2 days to about 7 days, about 2 days to about 6 days, about 2 days to about 5 days, about 2 days to about 4 days, about 4 days to about 1 year, about 4 days to about 11 months, about 4 days to about 10 months, about 4 days to about 9 months, about 4 days to about 8 months, about 4 days to about 7 months, about 4 days to about 6 months, about 4 days to about 5 months, about 4 days to about 4 months, about 4 days to about 3 months, about 4 days to about 2 months, about 4 days to about 4 weeks, about 4 days to about 3 weeks, about 4 days to about 2 weeks, about 4 days to about 7 days, about 7 days to about 1 year, about 7 days to about 11 months, about 7 days to about 10 months, about 7 days to about 9 months, about 7 days to about 8 months, about 7 days to about 7 months, about 7 days to about 6 months, about 7 days to about 5 months, about 7 days to about 4 months, about 7 days to about 3 months, about 7 days to about 2 months, about 7 days to about 4 weeks, about 7 days to about 3 weeks, about 7 days to about 2 weeks, about 2 weeks to about 1 year, about 2 weeks to about 11 months, about 2 weeks to about 10 months, about 2 weeks to about 9 months, about 2 weeks to about 8 months, about 2 weeks to about 7 months, about 2 weeks to about 6 months, about 2 weeks to about 5 months, about 2 weeks to about 4 months, about 2 weeks to about 3 months, about 2 weeks to about 2 months, about 2 weeks to about 4 weeks, about 2 weeks to about 3 weeks, about 3 weeks to about 1 year, about 3 weeks to about 11 months, about 3 weeks to about 10 months, about 3 weeks to about 9 months, about 3 weeks to about 8 months, about 3 weeks to about 7 months, about 3 weeks to about 6 months, about 3 weeks to about 5 months, about 3 weeks to about 4 months, about 3 weeks to about 3 months, about 3 weeks to about 2 months, about 3 weeks to about 4 weeks, about 4 weeks to about 1 year, about 4 weeks to about 11 months, about 4 weeks to about 10 months, about 4 weeks to about 9 months, about 4 weeks to about 8 months, about 4 weeks to about 7 months, about 4 weeks to about 6 months, about 4 weeks to about 5 months, about 4 weeks to about 4 months, about 4 weeks to about 3 months, about 4 weeks to about 2 months, about 2 months to about 1 year, about 2 months to about 11 months, about 2 months to about 10 months, about 2 months to about 9 months, about 2 months to about 8 months, about 2 months to about 7 months, about 2 months to about 6 months, about 2 months to about 5 months, about 2 months to about 4 months, about 2 months to about 3 months, about 3 months to about 1 year, about 3 months to about 11 months, about 3 months to about 10 months, about 3 months to about 9 months, about 3 months to about 8 months, about 3 months to about 7 months, about 3 months to about 6 months, about 3 months to about 5 months, about 3 months to about 4 months, about 4 months to about 1 year, about 4 months to about 11 months, about 4 months to about 10 months, about 4 months to about 9 months, about 4 months to about 8 months, about 4 months to about 7 months, about 4 months to about 6 months, about 4 months to about 5 months, about 5 months to about 1 year, about 5 months to about 11 months, about 5 months to about 10 months, about 5 months to about 9 months, about 5 months to about 8 months, about 5 months to about 7 months, about 5 months to about 6 months, about 6 months to about 1 year, about 6 months to about 11 months, about 6 months to about 10 months, about 6 months to about 9 months, about 6 months to about 8 months, about 6 months to about 7 months, about 7 months to about 1 year, about 7 months to about 11 months, about 7 months to about 10 months, about 7 months to about 9 months, about 7 months to about 8 months, about 8 months to about 1 year, about 8 months to about 11 months, about 8 months to about 10 months, about 8 months to about 9 months, about 9 months to about 1 year, about 9 months to about 11 months, about 9 months to about 10 months, about 10 months to about 1 year, about 10 months to about 11 months, or about 11 months to about 1 year.

For example, in any aspect or embodiment described herein, the color of the light color lignin is color stable at temperatures of about 150° C. or less, about 140° C. or less, about 130° C. or less, about 120° C. or less, about 110° C. or less, about 100° C. or less, about 90° C. or less, about 80° C. or less, about 70° C. or less, or about 60° C. or less for a period of time of that is less than or equal to 7 days (e.g., about 7 days, about 6 days, about 5 days, about 4 days, about 3 days, about 48 hours, about 42 hours, about 36 hours, about 34 hours, about 32 hours, about 30 hours, about 28 hours, about 26 hours, about 24 hours, about 22 hours, about 20 hours, about 18 hours, about 16 hours, about 14 hours, about 12 hours, about 10 hours, about 8 hours, about 6 hours, about 4 hours, about 1 hour to about 7 days, about 1 hour to about 6 days, about 1 hour to about 5 days, about 1 hour to about 4 days, about 1 hour to about 3 days, about 1 hour to about 48 hours, about 1 hour to about 42 hours, about 1 hour to about 36 hours, about 1 hour to about 30 hours, about 1 hour to about 28 hours, about 1 hour to about 26 hours, about 1 hour to about 24 hours, about 1 hour to about 22 hours, about 1 hour to about 20 hours, about 1 hour to about 18 hours, about 1 hour to about 16 hours, about 1 hour to about 14 hours, about 1 hour to about 12 hours, about 1 hour to about 10 hours, about 1 hour to about 8 hours, about 1 hour to about 6 hours, about 1 hour to about 4 hours, about 3 hour to about 7 days, about 3 hour to about 6 days, about 3 hour to about 5 days, about 3 hour to about 4 days, about 3 hour to about 3 days, about 3 hour to about 48 hours, about 3 hour to about 42 hours, about 3 hour to about 36 hours, about 3 hour to about 30 hours, about 3 hour to about 28 hours, about 3 hour to about 26 hours, about 3 hour to about 24 hours, about 3 hour to about 22 hours, about 3 hour to about 20 hours, about 3 hour to about 18 hours, about 3 hour to about 16 hours, about 3 hour to about 14 hours, about 3 hour to about 12 hours, about 3 hour to about 10 hours, about 3 hour to about 8 hours, about 3 hour to about 6 hours, about 5 hour to about 7 days, about 5 hour to about 6 days, about 5 hour to about 5 days, about 5 hour to about 4 days, about 5 hour to about 3 days, about 5 hour to about 48 hours, about 5 hour to about 42 hours, about 5 hour to about 36 hours, about 5 hour to about 30 hours, about 5 hour to about 28 hours, about 5 hour to about 26 hours, about 5 hour to about 24 hours, about 5 hour to about 22 hours, about 5 hour to about 20 hours, about 5 hour to about 18 hours, about 5 hour to about 16 hours, about 5 hour to about 14 hours, about 5 hour to about 12 hours, about 5 hour to about 10 hours, about 5 hour to about 8 hours, about 7 hour to about 7 days, about 7 hour to about 6 days, about 7 hour to about 5 days, about 7 hour to about 4 days, about 7 hour to about 3 days, about 7 hour to about 48 hours, about 7 hour to about 42 hours, about 7 hour to about 36 hours, about 7 hour to about 30 hours, about 7 hour to about 28 hours, about 7 hour to about 26 hours, about 7 hour to about 24 hours, about 7 hour to about 22 hours, about 7 hour to about 20 hours, about 7 hour to about 18 hours, about 7 hour to about 16 hours, about 7 hour to about 14 hours, about 7 hour to about 12 hours, about 7 hour to about 10 hours, about 9 hour to about 7 days, about 9 hour to about 6 days, about 9 hour to about 5 days, about 9 hour to about 4 days, about 9 hour to about 3 days, about 9 hour to about 48 hours, about 9 hour to about 42 hours, about 9 hour to about 36 hours, about 9 hour to about 30 hours, about 9 hour to about 28 hours, about 9 hour to about 26 hours, about 9 hour to about 24 hours, about 9 hour to about 22 hours, about 9 hour to about 20 hours, about 9 hour to about 18 hours, about 9 hour to about 16 hours, about 9 hour to about 14 hours, about 9 hour to about 12 hours, about 11 hour to about 7 days, about 11 hour to about 6 days, about 11 hour to about 5 days, about 11 hour to about 4 days, about 11 hour to about 3 days, about 11 hour to about 48 hours, about 11 hour to about 42 hours, about 11 hour to about 36 hours, about 11 hour to about 30 hours, about 11 hour to about 28 hours, about 11 hour to about 26 hours, about 11 hour to about 24 hours, about 11 hour to about 22 hours, about 11 hour to about 20 hours, about 11 hour to about 18 hours, about 11 hour to about 16 hours, about 11 hour to about 14 hours, about 13 hour to about 7 days, about 13 hour to about 6 days, about 13 hour to about 5 days, about 13 hour to about 4 days, about 13 hour to about 3 days, about 13 hour to about 48 hours, about 13 hour to about 42 hours, about 13 hour to about 36 hours, about 13 hour to about 30 hours, about 13 hour to about 28 hours, about 13 hour to about 26 hours, about 13 hour to about 24 hours, about 13 hour to about 22 hours, about 13 hour to about 20 hours, about 13 hour to about 18 hours, about 13 hour to about 16 hours, about 15 hour to about 7 days, about 15 hour to about 6 days, about 15 hour to about 5 days, about 15 hour to about 4 days, about 15 hour to about 3 days, about 15 hour to about 48 hours, about 15 hour to about 42 hours, about 15 hour to about 36 hours, about 15 hour to about 30 hours, about 15 hour to about 28 hours, about 15 hour to about 26 hours, about 15 hour to about 24 hours, about 15 hour to about 22 hours, about 15 hour to about 20 hours, about 15 hour to about 18 hours, about 17 hour to about 7 days, about 17 hour to about 6 days, about 17 hour to about 5 days, about 17 hour to about 4 days, about 17 hour to about 3 days, about 17 hour to about 48 hours, about 17 hour to about 42 hours, about 17 hour to about 36 hours, about 17 hour to about 30 hours, about 17 hour to about 28 hours, about 17 hour to about 26 hours, about 17 hour to about 24 hours, about 17 hour to about 22 hours, about 17 hour to about 20 hours, about 19 hour to about 7 days, about 19 hour to about 6 days, about 19 hour to about 5 days, about 19 hour to about 4 days, about 19 hour to about 3 days, about 19 hour to about 48 hours, about 19 hour to about 42 hours, about 19 hour to about 36 hours, about 19 hour to about 30 hours, about 19 hour to about 28 hours, about 19 hour to about 26 hours, about 19 hour to about 24 hours, about 19 hour to about 22 hours, about 21 hour to about 7 days, about 21 hour to about 6 days, about 21 hour to about 5 days, about 21 hour to about 4 days, about 21 hour to about 3 days, about 21 hour to about 48 hours, about 21 hour to about 42 hours, about 21 hour to about 36 hours, about 21 hour to about 30 hours, about 21 hour to about 28 hours, about 21 hour to about 26 hours, about 21 hour to about 24 hours, about 23 hour to about 7 days, about 23 hour to about 6 days, about 23 hour to about 5 days, about 23 hour to about 4 days, about 23 hour to about 3 days, about 23 hour to about 48 hours, about 23 hour to about 42 hours, about 23 hour to about 36 hours, about 23 hour to about 30 hours, about 23 hour to about 28 hours, about 23 hour to about 26 hours, about 25 hour to about 7 days, about 25 hour to about 6 days, about 25 hour to about 5 days, about 25 hour to about 4 days, about 25 hour to about 3 days, about 25 hour to about 48 hours, about 25 hour to about 42 hours, about 25 hour to about 36 hours, about 25 hour to about 30 hours, about 25 hour to about 28 hours, about 27 hour to about 7 days, about 27 hour to about 6 days, about 27 hour to about 5 days, about 27 hour to about 4 days, about 27 hour to about 3 days, about 27 hour to about 48 hours, about 27 hour to about 42 hours, about 27 hour to about 36 hours, about 27 hour to about 30 hours, about 29 hour to about 7 days, about 29 hour to about 6 days, about 29 hour to about 5 days, about 29 hour to about 4 days, about 29 hour to about 3 days, about 29 hour to about 48 hours, about 29 hour to about 42 hours, about 29 hour to about 36 hours, about 33 hour to about 7 days, about 33 hour to about 6 days, about 33 hour to about 5 days, about 33 hour to about 4 days, about 33 hour to about 3 days, about 33 hour to about 48 hours, about 33 hour to about 42 hours, about 37 hour to about 7 days, about 37 hour to about 6 days, about 37 hour to about 5 days, about 37 hour to about 4 days, about 37 hour to about 3 days, about 37 hour to about 48 hours, about 37 hours to about 42 hours, about 41 hour to about 7 days, about 41 hour to about 6 days, about 41 hour to about 5 days, about 41 hour to about 4 days, about 41 hour to about 3 days, about 41 hour to about 48 hours, about 45 hour to about 7 days, about 45 hour to about 6 days, about 45 hour to about 5 days, about 45 hour to about 4 days, about 45 hour to about 3 days, about 2 days to about 7 days, about 2 days to about 6 days, about 2 days to about 5 days, about 2 days to about 4 days, about 2 days to about 3 days, about 3 days to about 7 days, about 3 days to about 6 days, about 3 days to about 5 days, about 3 days to about 4 days, about 4 days to about 7 days, about 4 days to about 6 days, about 4 days to about 5 days, about 5 days to about 7 days, about 5 days to about 6 days, or about 6 days to about 7 days).

In any aspect or embodiment described herein, the light colored lignin produced by the method of the present disclosure is color stable at a pH ranging from about 8 to about 10 (e.g., about 8 to about 9, about 9 to about 10, or about 8.5 to about 9.5).

In any aspect or embodiment described herein, at least one of: the hypochlorite composition is slowly added to the lignin composition; the hydrogen peroxide is slowly added to the hypochlorite treated lignin (e.g., to avoid or minimize foaming of the reaction mixture); or a composition thereof. In any aspect or embodiment described herein, the hypochlorite composition can be added over a period of time up to about 10 hours. For example, the hypochlorite composition may be added over a period of time no greater than about 10 hours, no greater than about 9 hours, no greater than about 8 hours, no greater than about 7 hours, no greater than about 6 hours, no greater than about 5 hours, no greater than about 4 hours, no greater than about 3 hours, no greater than about 2 hours, no greater than about 1 hour, about 30 minutes to about 10 hours, about 30 minutes to about 9 hours, about 30 minutes to about 8 hours, about 30 minutes to about 7 hours, about 30 minutes to about 6 hours, about 30 minutes to about 5 hours, about 30 minutes to about 4 hours, about 30 minutes to about 3 hours, about 30 minutes to about 2 hours, about 30 minutes to about 1 hour, about 1 hour to about 10 hours, about 1 hour to about 9 hours, about 1 hour to about 8 hours, about 1 hour to about 7 hours, about 1 hour to about 6 hours, about 1 hour to about 5 hours, about 1 hour to about 4 hours, about 1 hour to about 3 hours, about 1 hour to about 2 hours, about 2 hours to about 10 hours, about 2 hours to about 9 hours, about 2 hours to about 8 hours, about 2 hours to about 7 hours, about 2 hours to about 6 hours, about 2 hours to about 5 hours, about 2 hours to about 4 hours, about 2 hours to about 3 hours, about 3 hours to about 10 hours, about 3 hours to about 9 hours, about 3 hours to about 8 hours, about 3 hours to about 7 hours, about 3 hours to about 6 hours, about 3 hours to about 5 hours, about 3 hours to about 4 hours, about 4 hours to about 10 hours, about 4 hours to about 9 hours, about 4 hours to about 8 hours, about 4 hours to about 7 hours, about 4 hours to about 6 hours, about 4 hours to about 5 hours, about 5 hours to about 10 hours, about 5 hours to about 9 hours, about 5 hours to about 8 hours, about 5 hours to about 7 hours, about 5 hours to about 6 hours, about 6 hours to about 10 hours, about 6 hours to about 9 hours, about 6 hours to about 8 hours, about 6 hours to about 7 hours, about 7 hours to about 10 hours, about 7 hours to about 9 hours, about 7 hours to about 8 hours, about 8 hours to about 10 hours, about 8 hours to about 9 hours, or about 9 hours to about 10 hours.

For example, in any aspect or embodiment described herein, the hypochlorite composition may be added at a rate of about 5% per hour to about 100% per 30 minutes, about 5% per hour to about 100% per hour, about 5% per hours to about 90% per hour, about 5% per hour to about 80% per hour, about 5% per hour to about 70% per hour, about 5% per hour to about 60% per hour, about 5% per hour to about 50% per hour, about 5% per hour to about 40% per hour, about 5% per hour to about 30% per hour, about 5% per hour to about 20% per hour, about 10% per hour to about 100% per 30 minutes, about 10% per hour to about 100% per hour, about 10% per hour to about 90% per hour, about 10% per hour to about 80% per hour, about 10% per hour to about 70% per hour, about 10% per hour to about 60% per hour, about 10% per hour to about 50% per hour, about 10% per hour to about 40% per hour, about 10% per hour to about 30% per hour, about 10% per hour to about 20% per hour, about 20% per hour to about 100% per 30 minutes, about 20% per hour to about 100% per hour, about 20% per hour to about 90% per hour, about 20% per hour to about 80% per hour, about 20% per hour to about 70% per hour, about 20% per hour to about 60% per hour, about 20% per hour to about 50% per hour, about 20% per hour to about 40% per hour, about 20% per hour to about 30% per hour, about 30% per hour to about 100% per 30 minutes, about 30% per hour to about 100% per hour, about 30% per hour to about 90% per hour, about 30% per hour to about 80% per hour, about 30% per hour to about 70% per hour, about 30% per hour to about 60% per hour, about 30% per hour to about 50% per hour, about 30% per hour to about 40% per hour, about 40% per hour to about 100% per 30 minutes, about 40% per hour to about 100% per hour, about 40% per hour to about 90% per hour, about 40% per hour to about 80% per hour, about 40% per hour to about 70% per hour, about 40% per hour to about 60% per hour, about 40% per hour to about 50% per hour, about 50% per hour to about 100% per 30 minutes, about 50% per hour to about 100% per hour, about 50% per hour to about 90% per hour, about 50% per hour to about 80% per hour, about 50% per hour to about 70% per hour, about 50% per hour to about 60% per hour, about 60% per hour to about 100% per 30 minutes, about 60% per hour to about 100% per hour, about 60% per hour to about 90% per hour, about 60% per hour to about 80% per hour, about 60% per hour to about 70% per hour, about 70% per hour to about 100% per 30 minutes, about 70% per hour to about 100% per hour, about 70% per hour to about 90% per hour, about 70% per hour to about 80% per hour, about 80% per hour to about 100% per 30 minutes, about 80% per hour to about 100% per hour, about 80% per hour to about 90% per hour, about 90% per hour to about 100% per 30 minutes, about 90% per hour to about 100% per hour, or about 100% per hour to about 100% per 30 minutes.

Furthermore, in any aspect or embodiment described herein, the hydrogen peroxide can be added, e.g., over a period of time up to about 10 hours. For example, the hydrogen peroxide may be added over a period of time no greater than about 10 hours, no greater than about 9 hours, no greater than about 8 hours, no greater than about 7 hours, no greater than about 6 hours, no greater than about 5 hours, no greater than about 4 hours, no greater than about 3 hours, no greater than about 2 hours, no greater than about 1 hours, about 30 minutes to about 10 hours, about 30 minutes to about 9 hours, about 30 minutes to about 8 hours, about 30 minutes to about 7 hours, about 30 minutes to about 6 hours, about 30 minutes to about 5 hours, about 30 minutes to about 4 hours, about 30 minutes to about 3 hours, about 30 minutes to about 2 hours, about 30 minutes to about 1 hour, about 1 hour to about 10 hours, about 1 hour to about 9 hours, about 1 hour to about 8 hours, about 1 hour to about 7 hours, about 1 hour to about 6 hours, about 1 hour to about 5 hours, about 1 hour to about 4 hours, about 1 hour to about 3 hours, about 1 hour to about 2 hours, about 2 hours to about 10 hours, about 2 hours to about 9 hours, about 2 hours to about 8 hours, about 2 hours to about 7 hours, about 2 hours to about 6 hours, about 2 hours to about 5 hours, about 2 hours to about 4 hours, about 2 hours to about 3 hours, about 3 hours to about 10 hours, about 3 hours to about 9 hours, about 3 hours to about 8 hours, about 3 hours to about 7 hours, about 3 hours to about 6 hours, about 3 hours to about 5 hours, about 3 hours to about 4 hours, about 4 hours to about 10 hours, about 4 hours to about 9 hours, about 4 hours to about 8 hours, about 4 hours to about 7 hours, about 4 hours to about 6 hours, about 4 hours to about 5 hours, about 5 hours to about 10 hours, about 5 hours to about 9 hours, about 5 hours to about 8 hours, about 5 hours to about 7 hours, about 5 hours to about 6 hours, about 6 hours to about 10 hours, about 6 hours to about 9 hours, about 6 hours to about 8 hours, about 6 hours to about 7 hours, about 7 hours to about 10 hours, about 7 hours to about 9 hours, about 7 hours to about 8 hours, about 8 hours to about 10 hours, about 8 hours to about 9 hours, or about 9 hours to about 10 hours.

For example, in any aspect or embodiment described herein, the hydrogen peroxide may be added at a rate of may be added at a rate of about 5% per hour to about 100% per 30 minutes, about 5% per hour to about 100% per hour, about 5% per hour to about 90% per hour, about 5% per hour to about 80% per hour, about 5% per hour to about 70% per hour, about 5% per hour to about 60% per hour, about 5% per hour to about 50% per hour, about 5% per hour to about 40% per hour, about 5% per hour to about 30% per hour, about 5% per hour to about 20% per hour, about 10% per hour to about 100% per 30 minutes, about 10% per hour to about 100% per hour, about 10% per hour to about 90% per hour, about 10% per hour to about 80% per hour, about 10% per hour to about 70% per hour, about 10% per hour to about 60% per hour, about 10% per hour to about 50% per hour, about 10% per hour to about 40% per hour, about 10% per hour to about 30% per hour, about 10% per hour to about 20% per hour, about 20% per hour to about 100% per 30 minutes, about 20% per hour to about 100% per hour, about 20% per hour to about 90% per hour, about 20% per hour to about 80% per hour, about 20% per hour to about 70% per hour, about 20% per hour to about 60% per hour, about 20% per hour to about 50% per hour, about 20% per hour to about 40% per hour, about 20% per hour to about 30% per hour, about 30% per hour to about 100% per 30 minutes, about 30% per hour to about 100% per hour, about 30% per hour to about 90% per hour, about 30% per hour to about 80% per hour, about 30% per hour to about 70% per hour, about 30% per hour to about 60% per hour, about 30% per hour to about 50% per hour, about 30% per hour to about 40% per hour, about 40% per hour to about 100% per 30 minutes, about 40% per hour to about 100% per hour, about 40% per hour to about 90% per hour, about 40% per hour to about 80% per hour, about 40% per hour to about 70% per hour, about 40% per hour to about 60% per hour, about 40% per hour to about 50% per hour, about 50% per hour to about 100% per 30 minutes, about 50% per hour to about 100% per hour, about 50% per hour to about 90% per hour, about 50% per hour to about 80% per hour, about 50% per hour to about 70% per hour, about 50% per hour to about 60% per hour, about 60% per hour to about 100% per 30 minutes, about 60% per hour to about 100% per hour, about 60% per hour to about 90% per hour, about 60% per hour to about 80% per hour, about 60% per hour to about 70% per hour, about 70% per hour to about 100% per 30 minutes, about 70% per hour to about 100% per hour, about 70% per hour to about 90% per hour, about 70% per hour to about 80% per hour, about 80% per hour to about 100% per 30 minutes, about 80% per hour to about 100% per hour, about 80% per hour to about 90% per hour, about 90% per hour to about 100% per 30 minutes, about 90% per hour to about 100% per hour, or about 100% per hour to about 100% per 30 minutes.

A further aspect of the present disclosure provides a light color lignin produce by the method of the present disclosure.

Furthermore, the Examples demonstrate that the degree of color reduction of lignosulfonates and sulfonated lignins is proportional to the amount of hypochlorite and hydrogen peroxide used. That is, greater amounts of hypochlorite and/or hydrogen peroxide reduce the color of lignosulfonates and sulfonated lignins to a greater extent than smaller amounts.

EXAMPLES

The present disclosure will not be illustrated by the following examples. The Examples demonstrate that the degree of color reduction of lignosulfonates and sulfonated lignins is proportional to the amount of hypochlorite and hydrogen peroxide used. However, because of the cost of bleaching agents, no more than a 2.5-fold weight ratio of the bleaching agent relative to the lignins was utilized in the examples. However, one skilled in the art will appreciate that higher amounts of bleaching agents could be utilized.

All light-color products of the oxidative bleach treatments, as described below, were concentrated to about 30% and spray dried with a Mini Spray Dryer B-290 by Blichi.

Color reduction was analyzed by measuring the samples at 500 nm with a HP 8453 UV-Vis Spectrophotometer with G1120A Multicell transport and/or by the Gardner scale (ASTM D1544-04(2010)) with a ColorQuest XT spectrophotometer (HunterLab; Reston, Va.). All measurements were carried out using a 0.1% solution of lignin sulfonates or sulfonated lignins in deionized water. The data for Examples 1-4 is shown in Table 1 below.

Example 1

One hundred grams of partially blocked sulfonated lignin (REAX LS; Ingevity® Corporation, North Charleston SC) was dissolved in water to make a 30% solution in a 2000 mL glass beaker equipped with an overhead stirrer. A thermocouple and pH probe were then placed in the beaker and the solution heated to about 60° C. with agitation. The reaction mixture was adjusted to a pH of 2 with concentrated sulfuric acid.

$Ca(ClO)_2$ (100 g with 60% available chlorine) was slowly added to the reaction mixture while maintaining the pH of 2 with the addition of sulfuric acid. The addition of the hypochlorite took about one hour. The mixture was heated to and maintained at a temperature of about 75° C. for two more hours, while adjusting agitation rate to break the foam. The mixture was then cooled to room temperature. The mixture was filtered with a fritted glass funnel to remove any precipitate that formed. The filtrate was purged with nitrogen until no chlorine was detected (e.g., about 1 to about 2 hours) by a chlorine test strip.

Calcium hydroxide (lime) was added to the filtrate to adjust the pH to about 10.0-10.5, and 100 g of a 30% hydrogen peroxide solution was slowly added. Small amount of calcium hydroxide was added to maintain the pH above 10. The mixture was heated to and maintained at a temperature of about 75° C. for two hours. The final mixture was then cooled to room temperature. The mixture was filtered with a fritted glass funnel to remove any precipitate that formed. The filtrate was then spray dried to obtain low color lignin powder.

Alternative amounts of hypochlorite and hydrogen peroxide were also tested and are shown in Table 1 below. For example, each of the following treatments of 100 g of blocked sulfonated lignin was examined: 250 g each of hypochlorite and hydrogen peroxide, 25 g each of hyprochlorite and hydrogen peroxide, and 250 g of hyprochlorite. The data of Example 1 demonstrates that the method of the present disclosure provides significant, stable color reduction of lignin.

Example 2

One hundred grams of unblocked sulfonated lignin (REAX 85A; Ingevity® Corporation, Charleston SC) was dissolved in water to make a 30% solution in a 2000 mL glass beaker equipped with an overhead stirrer. A thermocouple and pH probe were then placed in the beaker and the solution heated to about 60° C. with agitation. Concentrated sulfuric acid was added to the reaction mixture to adjust the pH to 2.

Ca(ClO)$_2$ (250 g with 60% available chlorine) was slowly added, while maintaining pH to 2 with sulfuric acid. The addition of the hypochlorite took about one hour. The mixture was heated to and maintained at about 75° C. for two hours, while adjusting agitation rate to break the foam. The mixture was then cooled to room temperature. The mixture was filtered with a fritted glass funnel to remove any precipitate that formed. The filtrate was purged with nitrogen until no chlorine was detected (e.g., 1-2 hours) by a chlorine test strip.

Calcium hydroxide (lime) was added to the filtrate to adjust the pH to about 10.0-10.5 and 250 g of a 30% hydrogen peroxide solution was slowly added. Small amount of calcium hydroxide was added to maintain the pH above 10. The mixture was heated to and maintained at about 75° C. for two hours. The final mixture was then cooled to room temperature. The mixture was filtered with a fritted glass funnel to remove any precipitate that formed. The solution was then spray dried to obtain low color lignin powder.

Example 3

One hundred grams of partially sulfonated lignin (REAX 825E; Ingevity® Corporation, North Charleston S.C.) was dissolved in water to make a 30% solution in a 2000 mL glass beaker equipped with an overhead stirrer. A thermocouple and pH probe were then placed in the beaker and the solution heated to about 60° C. with agitation. Concentrated sulfuric acid was added to the reaction mixture to adjust pH to 2.

Ca(ClO)$_2$ (50 g with 60% available chlorine) was slowly added while maintaining the pH to 2 with sulfuric acid. The addition took about one hour. The mixture was heated to and maintained at about 75° C. for two hours, while adjusting agitation rate to break the foam. The mixture was then cooled to room temperature. The mixture was filtered with a fritted glass funnel to remove any precipitate that formed. The filtrate was purged with nitrogen until no chlorine was detected (e.g., about 1 to about 2 hours) by a chlorine test strip.

Calcium hydroxide (lime) was added to the filtrate to adjust the pH to 10.0-10.5 and 50 g of a 30% hydrogen peroxide was added slowly. Small amount of calcium hydroxide was added to maintain the pH above 10. The mixture as heated to and maintained at about 75° C. for two hours. The final mixture was then cooled to room temperature. The mixture was filtered with a fritted glass funnel to remove any precipitate that formed. The solution was spray dried to obtain low color lignin powder.

Example 4

One hundred grams of unblocked lignosulfonate (REAX 260; Ingevity® Corporation, Charleston S.C.) was dissolved in water to make a 30% solution in a 2000 mL glass beaker equipped with an overhead stirrer. A thermocouple and pH probe were then placed in the beaker and the solution heated to about 60° C. with agitation. Concentrated sulfuric acid was added to the reaction mixture to adjust the pH to 2.

Ca(ClO)$_2$ (50 g with 60% available chlorine) was added slowly while maintaining the pH to 2 with sulfuric acid. The addition took about one hour. The mixture was heated to and maintained at about 75° C. for two hours, while adjusting the agitation rate to break the foam. The mixture was then cooled to room temperature. The mixture was filtered with a fritted glass funnel to remove any precipitate that formed. The filtrate was purged with nitrogen until no chlorine was detected (e.g., about 1 to about 2 hours) by a chlorine test strip.

To this solution was added calcium hydroxide (lime) to adjust pH 10.0-10.5 and 50 g of a 30% hydrogen peroxide was added slowly. Small amount of calcium hydroxide was added to maintain the pH above 10. The mixture as heated to 75° C. for two more hours. The final mixture was then cooled to room temperature and precipitate was filtered again with a fritted glass funnel. The solution was spray dried to obtain low color lignin powder.

Treatment of 100 g of unblocked lignosulfonate with 50 g each of hypochlorite and hydrogen peroxide was also tested. As shown below, even 50 g of hypochlorite and hydrogen peroxide provided a significant reduction in lignin color.

The results of the various treatment conditions are summarized in Table 1 below. As discussed above, the color reduction was measured by either UV spectrometer at 500 nm or by the Gardner scale with 0.1% concentration in deionized water.

TABLE 1

Color reduction of various lignins on different treatment conditions.

| Sample/conditions | UV Spectrophotometer | | Gardner Scale | |
| --- | --- | --- | --- | --- |
| | UV (500 nm) | % Color Reduction | Gardner Number | % Color reduction |
| REAX 85A | 0.6069 | N.A. | 8.2 | N.A. |
| REAX LS | 0.2424 | N.A. | 5.6 | N.A. |
| REAX 825E | 0.5428 | N.A. | 8.1 | N.A. |
| REAX 260 | 0.2548 | N.A. | 5.6 | N.A. |
| Example 1: ClO only, 2.5x lignin wt., on REAX LS | 0.1195 | 50.7 | 0.8 | 85.7 |
| Example 1: ClO followed by H$_2$O$_2$, each 2.5x lignin wt., on REAX LS | 0.00088 | 99.6 | 0.2 | 96.4 |
| Example 1: ClO followed by H$_2$O$_2$, each 1x lignin wt., on REAX LS | 0.0215 | 91.1 | 0.2 | 96.4 |
| Example 1: ClO followed by H$_2$O$_2$, each 0.25x lignin wt., on REAX LS | 0.0198 | 91.8 | 0.4 | 92.8 |
| Example 2: ClO followed by H$_2$O$_2$, each 2.5x lignin wt., on REAX 85A | 0.0518 | 91.5 | 2.0 | 75.6 |
| Example 3: ClO followed by H$_2$O$_2$, each 0.5x lignin wt., on REAX 825E | 0.0505 | 90.7 | 2.2 | 72.8 |
| Example 4: ClO followed by H$_2$O$_2$, each 1x lignin wt., on REAX 260 | 0.0203 | 92.0 | 0.7 | 87.5 |
| Example 4: ClO followed by H$_2$O$_2$, each 0.5x lignin wt. on REAX 260 | 0.0285 | 88.8 | 0.9 | 83.9 |

Specific Embodiments

An aspect of the disclosure provides a method of producing light colored lignin, the method comprising: reacting a lignin composition with a hypochlorite composition having about 5% to about 70% available chlorine; and reacting the hypochlorite treated lignin with hydrogen peroxide at a concentration of about 5% to about 50% to produce the light colored lignin, wherein the lignin composition includes at least one of sulfonated lignin, lignosulfonate, or both.

In any aspect or embodiment described herein, at least one of: prior to the step of reacting the lignin composition with a hypochlorite composition, adjusting at least one of the pH to from about 1 to less than about 7, adjusting the temperature to less than about 100° C., or both; the step of reacting the lignin composition with a hypochlorite composition includes at least one of adjusting the pH to <about 7, e.g., from about 1 to less than about 7, adjusting the temperature to less than about 100° C., or both; the step of reacting the hypochlorite treated lignin with hydrogen peroxide includes at least one adjusting the pH to >about 7, e.g., from greater than about 7 to less than about 14, adjusting the temperature to less than about 100° C., or both; or a combination thereof.

In any aspect or embodiment described herein, the method further comprises filtering the hypochlorite treated lignin to remove salts formed during the reaction.

In any aspect or embodiment described herein, the method further comprises filtering the light colored lignin to remove salts formed during the reaction.

In any aspect or embodiment described herein, the method further comprises sparging the hypochlorite treated lignin.

In any aspect or embodiment described herein, at least one of: sparging is performed for at least about 1 hour (e.g., about 1 hour to about 5 hours); sparging is a nitrogen or air sparging; or a combination thereof.

In any aspect or embodiment described herein, the hypochlorite composition includes at least one of a hypochlorite sodium salt, a hypochlorite potassium salt, a hypochlorite calcium salt, a hypochlorite magnesium salt, or a combination thereof.

In any aspect or embodiment described herein, the amount of the hypochlorite composition reacting with the lignin composition is about 10% to about 250% of the lignin composition weight.

In any aspect or embodiment described herein, the amount of the hydrogen peroxide reacting with the hypochlorite treated lignin is about 10% to about 250% of the lignin composition weight.

In any aspect or embodiment described herein, adjusting the pH of at least one of the lignin composition, the reaction mixture containing the lignin composition, or both is performed with at least one of hydrochloric acid, phosphoric acid, sulfuric acid, acetic acid, or a combination thereof.

In any aspect or embodiment described herein, adjusting the pH of at least one of the hypochlorite treated lignin, the reaction mixture contain the hypochlorite treated lignin, or both is performed with at least one of sodium hydroxide, potassium hydroxide, calcium hydroxide, magnesium hydroxide, or a combination thereof.

In any aspect or embodiment described herein, the lignin composition includes blocked sulfonated lignin.

In any aspect or embodiment described herein, the lignin composition includes unblocked sulfonated lignin.

In any aspect or embodiment described herein, the lignin composition includes blocked lignosulfonate.

In any aspect or embodiment described herein, the lignin composition includes unblocked lignosulfonate.

In any aspect or embodiment described herein, the lignin composition is an aqueous solution having about 1% to about 60% w/v sulfonated lignin or lignosulfonate.

In any aspect or embodiment described herein, the method further comprises at least one of: concentrating the low color lignin; drying the low color lignin; or both.

In any aspect or embodiment described herein, the low color lignin is spray dried.

In any aspect or embodiment described herein, the color of a blocked lignin composition comprising blocked lignosulfonates, blocked sulfonates lignins, or a combination thereof, is reduced by about 80% to about 99% relative to the untreated blocked lignin composition.

In any aspect or embodiment described herein, the color of a unblocked lignin composition comprising unblocked lignosulfonates, unblocked sulfonated lignins, or a combination thereof, is reduced by about 70% to about 99% relative to the untreated unblocked lignin composition.

In any aspect or embodiment described herein, the light colored lignin is color stable at temperatures up to about 150° C.

In any aspect or embodiment described herein, the light colored lignin is color stable at a pH ranging from about 8 to about 10.

In any aspect or embodiment described herein, at least one of: the hypochlorite composition is slowly added to the lignin composition; the hydrogen peroxide is slowly added to the hypochlorite treated lignin; or a composition thereof.

A further aspect of the present disclosure provides a color stable, light color lignin produced by the method of the present disclosure.

While several embodiments of the disclosure have been shown and described herein, it will be understood that such embodiments are provided by way of example only. Numerous variations, changes and substitutions will occur to those skilled in the art without departing from the spirit of the disclosure. Rather, the present disclosure is to cover all modifications, equivalents, and alternatives falling within the scope of the present disclosure as defined by the following appended claims and their legal equivalents. Accordingly, it is intended that the description and appended claims cover all such variations as fall within the spirit and scope of the disclosure.

The contents of all references, patents, pending patent applications and published patents, cited throughout this application are hereby expressly incorporated by reference.

Those skilled in the art will recognize, or be able to ascertain using no more than routine experimentation, many equivalents to the specific embodiments of the disclosure described herein. Such equivalents are intended to be encompassed by the following claims. It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

What is claimed is:

1. A method of producing light colored lignin, the method comprising:
   reacting a lignin composition with a hypochlorite composition having about 5% to about 70% available chlorine; and
   reacting the hypochlorite-treated lignin with hydrogen peroxide at a concentration of about 5 wt % to about 50 wt % to produce the light colored lignin,
   wherein the lignin composition includes at least one of sulfonated lignin, lignosulfonate, or both.

2. The method of claim 1, wherein at least one of:
   (i) prior to the step of reacting the lignin composition with a hypochlorite composition, adjusting at least one of the pH to less than 7, adjusting the temperature to less than about 100° C., or both;
   (ii) the step of reacting the lignin composition with a hypochlorite composition includes at least one of adjusting the pH to less than 7, adjusting the temperature to less than about 100° C., or both;
   (iii) the step of reacting the hypochlorite treated lignin with hydrogen peroxide includes at least one adjusting the pH to greater than 7, adjusting the temperature to less than about 100° C., or both; or
   (iv) a combination thereof.

3. The method of claim 2, further comprising a step of filtering the hypochlorite treated lignin to remove salts formed during the reaction.

4. The method of claim 3, further comprising a step of filtering the light colored lignin to remove salts formed during the reaction.

5. The method of claim 4, further comprising sparging the hypochlorite treated lignin.

6. The method of claim 5, wherein at least one of:
   sparging is performed for at least about 1 hour (e.g., about 1 hour to about 5 hours);
   sparging is a nitrogen or air sparging; or
   a combination thereof.

7. The method of claim 1, wherein the hypochlorite composition includes at least one of a sodium salt, a potassium salt, a calcium salt, a magnesium salt, or a combination thereof.

8. The method of claim 1, wherein the amount of the hypochlorite composition reacting with the lignin composition is about 10% to about 250% of the lignin composition weight.

9. The method of claim 1, wherein the amount of the hydrogen peroxide reacting with the hypochlorite treated lignin is about 10% to about 250% of the lignin composition weight.

10. The method of claim 2, wherein (i), (ii) or both are performed with at least one of hydrochloric acid, phosphoric acid, sulfuric acid, acetic acid, or a combination thereof.

11. The method of claim 2, wherein (iii) is performed with at least one of sodium hydroxide, potassium hydroxide, calcium hydroxide, magnesium hydroxide, or a combination thereof.

12. The method of claim 1, wherein the lignin composition includes at least one of blocked sulfonated lignin, blocked lignosulfonate or a combination thereof.

13. The method of claim 1, wherein the lignin composition includes at least one of unblocked sulfonated lignin, unblocked lignosulfonate or a combination thereof.

14. The method of claim 1, wherein the lignin composition is an aqueous solution having about 1% to about 60% w/v sulfonated lignin or lignosulfonate.

15. The method of claim 1, further comprising at least one of:
   concentrating the low color lignin;
   drying the low color lignin; or
   both.

16. The method of claim 15, wherein the low color lignin is spray dried.

17. The method of claim 1, wherein the color of a blocked lignin composition comprising blocked lignosulfonates, blocked sulfonates lignins or a combination thereof, is reduced by about 80% to about 99% relative to the untreated blocked lignin composition.

18. The method of claim 1, wherein the color of a unblocked lignin composition comprising unblocked lignosulfonates, unblocked sulfonated lignins or a combination thereof, is reduced by about 70% to about 99% relative to the untreated unblocked lignin composition.

19. The method of claim 1, wherein the light colored lignin is color stable at temperatures up to about 150° C., a pH ranging from about 8 to about 10 or both.

* * * * *